No. 844,026. PATENTED FEB. 12, 1907.
T. J. KIELEY & F. T. MUELLER.
FEED WATER HEATER.
APPLICATION FILED SEPT. 28, 1905.
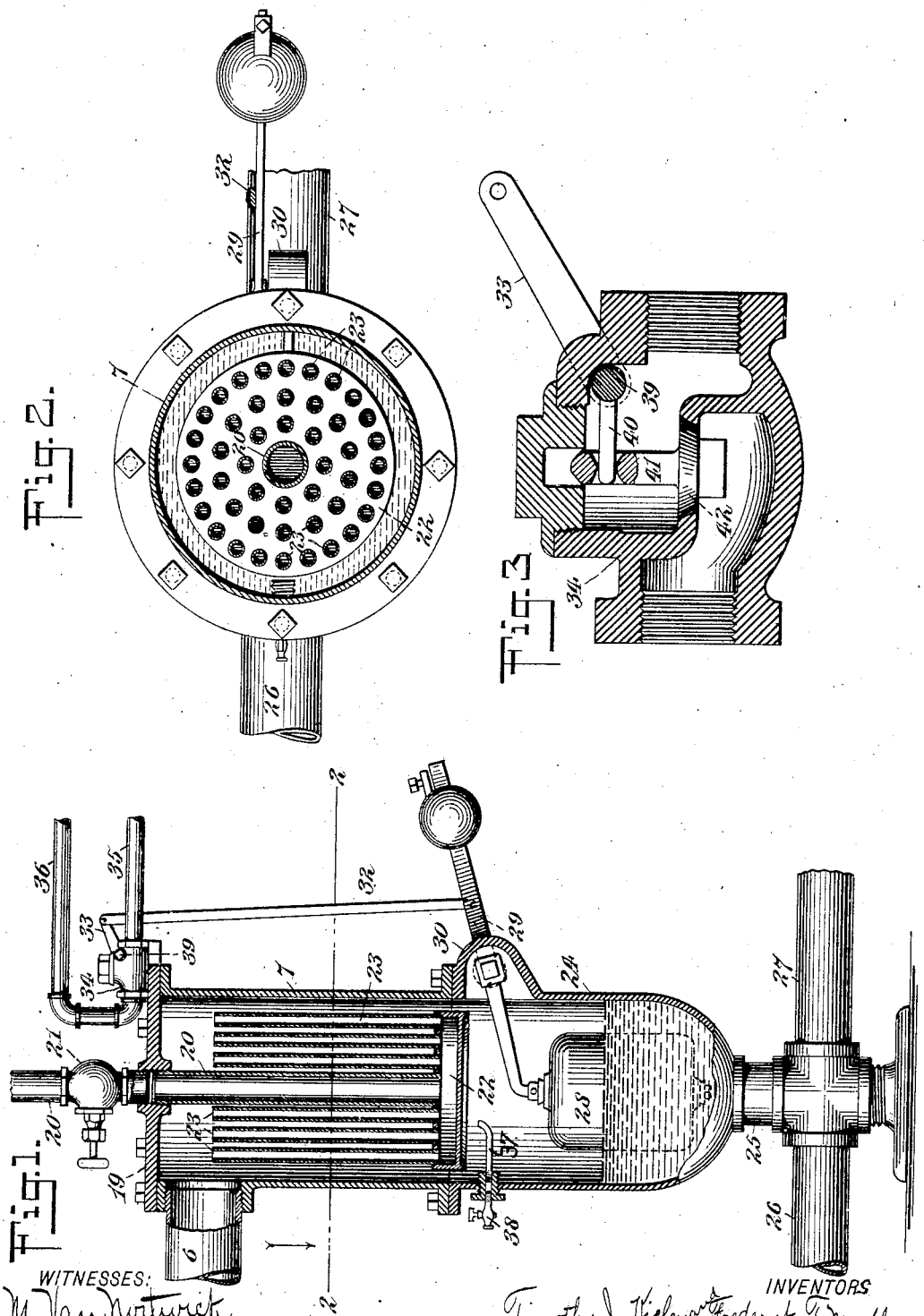
WITNESSES:
M. Van Nortwick
N. B. Smith
INVENTORS
Timothy J. Kieley and Frederick T. Mueller
BY their ATTORNEY
George Cook

UNITED STATES PATENT OFFICE.

TIMOTHY J. KIELEY AND FREDERICK T. MUELLER, OF NEW YORK, N. Y.

FEED-WATER HEATER.

No. 844,026.  Specification of Letters Patent.  Patented Feb. 12, 1907.

Application filed September 28, 1905. Serial No. 280,432.

*To all whom it may concern:*

Be it known that we, TIMOTHY J. KIELEY and FREDERICK T. MUELLER, citizens of the United States, and residents of New York, borough of Manhattan, county of New York, and State of New York, have made and invented certain new and useful Improvements in Feed-Water Heaters, of which the following is a specification.

Our invention relates to an improvement in feed-water heaters, the object being to provide a device of this character which shall be simple and economical to construct, efficient in use, and adapted to heat feed-water by means of exhaust-steam.

With these and other ends in view the invention consists in certain novel features of construction and combinations of parts, as will be hereinafter fully described, and pointed out in the claims.

In the accompanying drawings, Figure 1 is a view in vertical section of our improved feed-water heater. Fig. 2 is a sectional view taken on the line 2 2 of Fig. 1, and Fig. 3 is a sectional view of the valve adapted to be automatically opened and closed by a float in the heater.

Referring to the drawings, 7 represents a cylindrical tank, into the upper end of which leads the exhaust-steam pipe 6 and provided with a top 19, bolted or otherwise secured thereto. Through the top 19 passes the feed-water pipe 20, provided with a valve 21, the lower end of said pipe leading into a circular box or reservoir 22, somewhat smaller in diameter than the tank 7 and located at about the center thereof. From this reservoir 22 extend upwardly the pipes 23 to within a short distance of the top of said tank 7, these pipes being employed for retaining the feed-water for a considerable time within the heater before being pumped out of the bottom of the latter to the boiler and permit of said water being heated by the exhaust-steam which circulates between and around said pipes.

The lower end 24 of the heater forms a reservoir for the water of condensation and for the feed-water passing down through the pipe 20, reservoir 22, and pipes 23, the extreme lower end of said tank being provided with the pipe 25, with which connects the return-pipe 26 from radiators or steam-heating plant and also the suction-pipe 27, leading to a boiler. (Not shown.)

Within the lower end 24 of the tank or cylinder 7 is contained a float 28, pivoted to the inner end of a lever 29, the latter being pivoted to the projecting wall 30 of said tank, an adjustable counterweight being secured to the outer end of said lever. To the lever 29 is secured one end of the connecting-rod 32, the opposite end thereof being pivoted to one end of the lever 33, the other end of said lever 33 being connected to the shaft 39, journaled in the valve-casing 34, and to which shaft is secured the arm 40, the free end being connected with the valve-stem 41 of the valve proper, 42, said valve being located in the pipe 35 36, leading from a boiler to a steam-pump suitably located.

In practice the exhaust-steam flows through the pipe 6 into the tank or cylinder 7 and, circulating around and among the pipes 23, raises the temperature of the water flowing through the same, the water of condensation with the feed-water partially filling the reservoir 24. After the water rises to a certain height the float 28 is lifted, thereby lowering the outer end of the lever 29, and by means of the connecting-rod 32 and lever 33 raises the valve 42 from its seat 43, permitting the steam to flow from the boiler through the pipe 35 36 to a pump, which sucks or draws the water from the reservoir 24 to the boiler through pipe 27, as before described. Should the feed-water flow too fast or too slowly, the same may be regulated by means of the valve 21, the pipe 37 leading from the reservoir 24 to the outer side thereof and provided with the petcock 38 for the ingress or egress of air.

Having fully described our invention, what we claim as new, and desire to secure by Letters Patent, is—

1. A feed-water heater comprising a tank having a steam-exhaust pipe leading therein, a feed-water pipe, a reservoir within the tank, a vertical feed-water pipe entering the top of the tank and having its lower end connected to said reservoir, an annular series of vertical pipes surrounding the feed-water pipe and having their lower ends connecting with the reservoir and their upper ends terminating short of the top of the tank whereby the feed-water admitted to the reservoir flows upwardly through the vertical pipes and discharges over the upper ends thereof, said tank having a chamber for said feed-water and an outlet therefrom, and means including a float and a lever and connections for regulating the boiler-feed by the height of water in said chamber.

2. A feed-water heater, comprising a tank having a steam-exhaust pipe leading into the upper end thereof, a feed-water pipe passing downwardly through the top thereof, and at its lower end connected centrally with a reservoir a concentric series of vertical pipes surrounding the feed-water pipe having their lower ends connected to the reservoir and their upper ends terminating near the top of the tank, an outlet-pipe leading from the lower end of said tank, said tank having a reservoir for feed-water with which said outlet-pipe connects, and a buoyant member in the tank-reservoir and coöperating mechanism actuated thereby whereby the boiler-feed is automatically controlled by the height of water in said tank-reservoir.

Signed at New York, borough of Manhattan, county of New York, and State of New York, this 11th day of September, A. D. 1905.

TIMOTHY J. KIELEY.
FREDERICK T. MUELLER.

Witnesses:
M. VAN NORTWICK,
N. B. SMITH.